Aug. 30, 1966  H. SOUTHWORTH, JR., ET AL  3,269,192
TUNING FORK DIGITAL ACCELEROMETER
Filed Nov. 7, 1962  5 Sheets-Sheet 1

HAMILTON SOUTHWORTH JR.
JOHN C. STILES
INVENTORS

BY S. A. Giarratana

Francis H. Masselle
ATTORNEYS

Aug. 30, 1966

H. SOUTHWORTH, JR., ET AL 3,269,192

TUNING FORK DIGITAL ACCELEROMETER

Filed Nov. 7, 1962

HAMILTON SOUTHWORTH JR.
JOHN C. STILES
INVENTORS

BY S. A. Giarratana
Francis H. Masselle
ATTORNEYS

Aug. 30, 1966    H. SOUTHWORTH, JR., ETAL    3,269,192
TUNING FORK DIGITAL ACCELEROMETER
Filed Nov. 7, 1962                                         5 Sheets-Sheet 4

HAMILTON SOUTHWORTH JR.
JOHN C. STILES
*INVENTORS*

BY S.A. Giarratana
Francis L. Masselle
ATTORNEYS

United States Patent Office 3,269,192
Patented August 30, 1966

3,269,192
TUNING FORK DIGITAL ACCELEROMETER
Hamilton Southworth, Jr., New York, N.Y., and John C. Stiles, Morristown, N.J., assignors to General Precision, Inc., Little Falls, N.J., a corporation of Delaware
Filed Nov. 7, 1962, Ser. No. 236,107
16 Claims. (Cl. 73—517)

This invention relates to accelerometers and more particularly to an accelerometer producing a digital output proportional to the acceleration along a sensitive axis.

A prior art accelerometer producing a digital output is illustrated in Patent 2,928,668, issued to B. P. Blasingame on March 15, 1960. As disclosed in this patent, a vibrating reed with a magnet on the end thereof is caused to vibrate at its natural frequency which is a simple function of the inertia and spring constant of the reed, and the acceleration of the reed along its longitudinal axis. The reed is caused to vibrate at its natural frequency by means of an electrical pickup arranged to measure the velocity of the vibrating magnet on the free end of the reed and feed its output to an amplifier which supplies current to solenoids arranged to apply side forces to the reed proportional to the magnet's velocity. By arranging two identical such reeds back to back so that the natural frequency of one is increased while that of the other is decreased in response to acceleration along the longitudinal axis of the reeds, the two outputs may be combined to remove the unaccelerated natural frequency of the system and minimize drift due to temperature effects.

Another type of digital accelerometer which has proved to be more accurate and reliable employs two vibrating strings which are placed under equal initial tension. A geometry is used so that a one-axis acceleration input increases the tension in one string to the same magnitude as the tension is decreased in the other string, the initial tension being necessary to prevent collapse of the string experiencing reduced tension. This increases the natural frequency of the one string and decreases the natural frequency of the other, and by beating one string against the other the output beat frequency is proportional to the input acceleration with non-linearities significantly reduced. Since the natural frequency of the two strings is maintained by a sizeable initial tension in the strings, this accelerometer is very undesirable from a creep and temperature gradient standpoint. Creep will cause both strings to relax in time, lowering string frequencies to provide a false output acceleration. Any temperature gradient throughout the accelerometer will cause relative motion between foundation and across the strings, causing changes in string tensions and false output accelerations. In addition, the two strings are arranged in series across the supporting foundation in this accelerometer so that there is a tendency for both strings to vibrate at the same frequency in low G environments.

In accordance with the present invention, these disadvantages are overcome by employing a tuning fork arrangement comprising two tines clamped at each end and vibrated 180° out of phase. A dense inertial proof mass is secured to one pair of ends of the tines and supported against cross-axis movement perpendicular to the tines while being free to move longitudinally so as to extend or compress the tines when the mass is accelerated. Since the tuning fork is under no initial axial tension it has negligible creep and temperature gradient sensitivity under a zero G environment.

Accordingly, it is one object of the invention to provide an accelerometer which produces a digital output proportional to acceleration along one axis so that the number of digital counts per unit time can be computed to represent velocity.

It is another object of the invention to provide a digital accelerometer employing a vibrating tuning fork and a geometry which greatly reduces creep and temperature gradient sensitivity.

It is another object of the invention to provide a tuning fork accelerometer using quartz, which has superior mechanical characteristics as far as temperature stability and low internal damping are concerned.

It is a further object of the invention to provide a digital accelerometer employing vibrating tines having no initial tension imposed thereon under a zero G environment.

It is a still further object of the invention to provide a digital accelerometer employing a tuning fork formed by two vibrating tines clamped at both ends in a manner to prevent frequency "lock-in" effects and raise the quality factor (Q) of the tuning fork.

It is a still further object of the invention to provide a digital accelerometer of the type described above having two tuning forks arranged in parallel with the supporting foundation rather than in series as in the vibrating string accelerometer to reduce frequency "lock-in" effects.

Other objects and features of novelty of the present invention will be specifically pointed out or will otherwise become apparent when referring for a better understanding of the invention to the following description taken in conjunction with the accompanying drawings, wherein:

Figure 1:
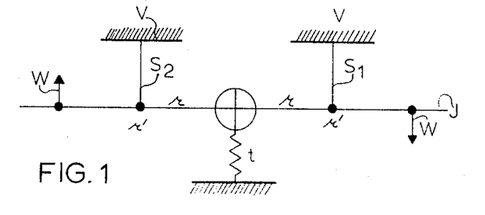
FIGURE 1 is a schematic view of a vibrating string arrangement.

Before going into a detailed explanation of the embodiments shown in FIGURES 2 to 10, the theoretical principles involved will be described in connection with the schematic string arrangement as depicted in FIGURE 1. The two string $S_1$ and $S_2$ are disposed at opposed ends of a lever of the first class J and firmly fastened to a wall V. At the midpoint of lever J is a spring $t$ exerting tension on the two strings. Acting on opposed sides of the lever are loads W. These loads are identical on both sides of the lever and equidistant from the virtual fulcrum. Thus, loads W form a couple having a resultant vertical force of zero. Furthermore, lever J is relatively fixed and merely senses the moment of the forces about the fulcrum. The result is that not only are the two strings $S_1$ and $S_2$ identical, but notwithstanding the forces acting on the strings, the length of the strings remains relatively stable so that for the present purpose, the length of string $S_1$ will be equal to that of string $S_2$ and the error in the difference in lengths may be disregarded.

It is well known that the resonant frequency of a string is obtained by the formula $$f = \sqrt{T \times \frac{1}{4mL}}$$

where

T is the tension in pounds
$m$ is the mass in pounds × seconds squared divided by inches (weight/gravity)
L is the length of the string in inches
but $$m = \rho A_s L$$

where $\rho$ (the Greek letter rho) is the mass density $$\frac{(\text{pounds} \times \text{sec.}^2)}{\text{inches}^4}$$

$A_s$ is the cross sectional area of the string in inches squared
L is the length of the string in inches Since we are disregarding any change in the length L of the string, the factor—$\frac{1}{4}mL$—may for some purposes be treated as a constant $k$. Disregarding the load W in FIGURE 1, since both strings $S_1$ and $S_2$ are identical, the frequency of both strings acted upon by spring $t$ is the same. This initial frequency is termed herein the fundamental frequency $f_0$. The tension is equal to the stress multiplied by the cross sectional area, or $$T = S_0 A_s$$

where $S_0$ is the stress on string $S_1$ and $S_2$ at the fundamental frequency $f_0$
$A_s$ is as stated above the cross sectional area of the string in inches squared and $$DT = DSA_s$$

DS being the change in stress caused by any change in tension DT
From the foregoing fundamentals $$f_0 = \sqrt{kT}$$

If the lever J is acted upon by loads W, changing the tension on string $S_1$ and $S_2$ $$f_{s_1} = \sqrt{k(T_s + DT)} \text{ and } f_{s_2} = \sqrt{k(T_s - DT)}$$

substituting $\frac{1}{4}mL$ for $k$ and concentrating on $f_{s_1}$ $$f_{s_1} = \sqrt{\frac{1}{4mL}(T_s + DT)}$$

but as already stated $$m = \rho A_s L$$
$$T = S_0 A_s$$

and $$DT = DSA_s$$

therefore $$f_{s_1} = \sqrt{\frac{1}{4 \times \rho A_s L \times L}(S_0 A_s + DSA_s)}$$

by simplification we get $$f_{s_1} = \frac{1}{2L}\sqrt{\frac{1}{\rho}(S_0 + DS)}$$

but $$f_0 = \sqrt{kT} = \sqrt{\frac{1}{4mL} \times T} = \sqrt{\frac{1}{4\rho A_s L^2} \times T} = f_0 = \frac{1}{2L}\sqrt{\frac{T}{\rho A_s}} = \frac{1}{2L}\sqrt{\frac{S_0 A_s}{\rho A_s}} = f_0 = \frac{1}{2L}\sqrt{\frac{S_0}{\rho}}\frac{1}{L} = 2f_0\sqrt{\frac{\rho}{S_0}} \text{ and } L =$$

$$\frac{1}{2f_0}\sqrt{\frac{S_0}{\rho}}$$

Therefore $$f_{s_1} = \frac{1}{2L}\sqrt{\frac{1}{\rho}(S_0 + DS)}$$

$$= \frac{1}{2}\left(2f_0\sqrt{\frac{\rho}{S_0}}\right) \times \sqrt{\frac{1}{\rho}(S_0 + DS)}$$

$$= f_0 \sqrt{\frac{S_0 + DS}{S_0}}$$

$$= f_0 \sqrt{1 + \frac{DS}{S_0}}$$

In the same way $$f_{s_2} = f_0 \sqrt{1 - \frac{DS}{S_0}}$$

If we let $$x = \frac{DS}{S_0} = \frac{DT}{T_s}$$

Since $$f_{s_1} = f_0 + Df_{s_1}$$

and $$f_{s_2} = f_0 - Df_{s_2}$$

$$Df_{s_1} = f_{s_1} - f_0 = (f_0\sqrt{1+x}) - f_0$$
$$= f_0(\sqrt{1+x} - 1)$$
$$Df_{s_2} = f_0(1 - \sqrt{1-x})$$
$$Df = Df_{s_1} + Df_{s_2} = f_0(\sqrt{1+x} - \sqrt{1-x})$$

We define

Error = (Exact frequency − approximate frequency)

and since $$(f_{s_1})^2 = (f_0 + Df_{s_1})^2 = k(T_s + DT)$$

and $$(f_0)^2 = (kT_s)$$

therefore $$(f_{s_1})^2 = (f_0)^2 + 2f_0 Df_{s_1} + (Df_{s_1})^2$$
$$= kT_s + 2f_0 Df_{s_1} + (Df_{s_1})^2 = kT_s + kDT$$

and $$2f_0 Df_{s_1} + (Df_{s_1})^2 = kDT$$

The approximate frequency is obtained by neglecting $(Df_{s_1})^2$ or $$Df_{s_1} = \frac{k}{2f_0}DT$$

substituting for $k$ and $DT$ yields $$Df_{s_1} = \frac{f_0^2}{T_s}\frac{1}{2f_0}T_s x = \frac{x}{2}f_0$$

and $$f_1 \text{ is approximately} = f_0\left(1 + \frac{x}{2}\right)$$

$$f_2 \text{ is approximately} = f_0\left(1 - \frac{x}{2}\right)$$

The important feature of the arrangement depicted in FIGURE 1 is that the vibrating strings are perfect in push-pull relationship. Of course it is essential in such an arrangement that the strings have a high Q, i.e., there be little loss due to hysteresis. In addition to these problems there are a multitude of other factors which each taken individually may be negligible but when combined cause errors. It has been found by practical experience, however, that these minute error causing factors tend to cancel out when the push-pull arrangement depicted in FIGURE 1 is employed, and a much greater accuracy is obtained.

Another factor which tends to cancel out to some extent is the effect of temperature change. However, because of the sizeable initial tension which must be employed under a zero G environment so that one of the strings will merely have the tension reduced by acceleration rather than collapse, string vibrating devices inherently have severe temperature sensitivity. Any temperature expansion of the supporting structure or strings will change the initial stress field and produce undesirable frequency change. In accordance with the present invention this severe temperature sensitivity is eliminated by employing a tuning fork vibrating element which has no stress environment under zero G acceleration and a cantilever arrangement which eliminates stress changes in the tuning fork due to foundation, thermal expansion or contraction.

Figure 2:
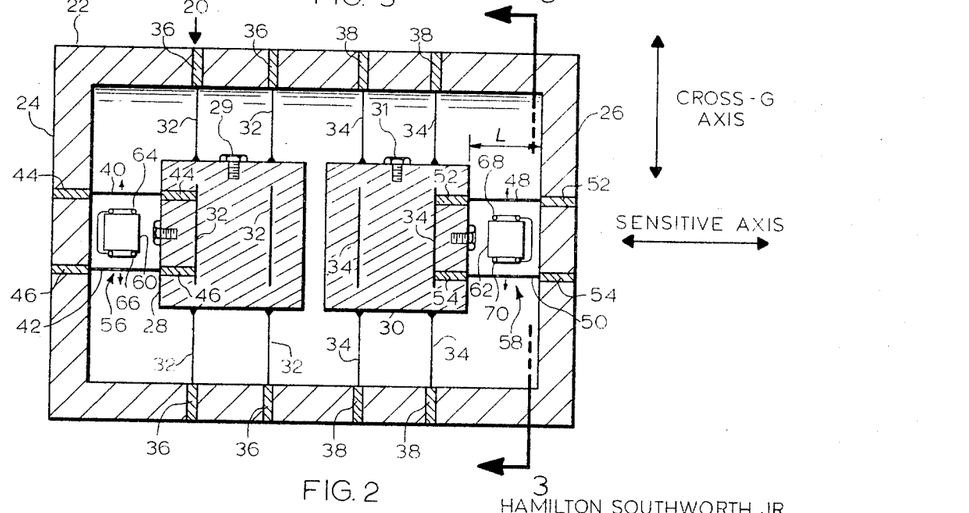
FIGURE 2 is a sectional view of a digital accelerometer embodying features of the present invention.
Figure 3:
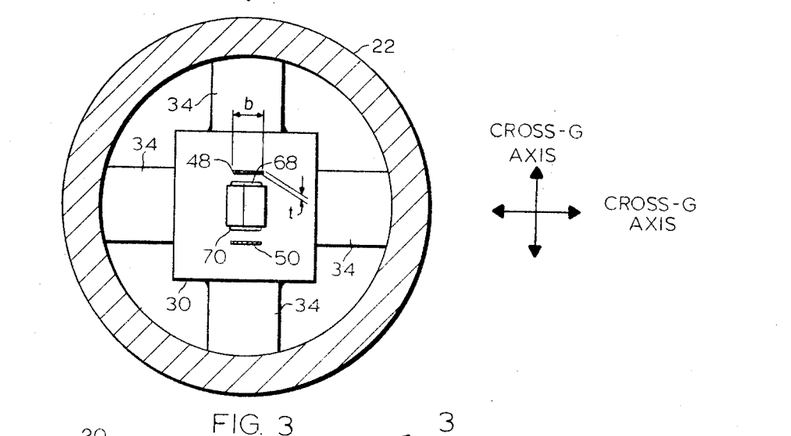
FIGURE 3 is a cross-sectional view taken along the line 3—3 of FIGURE 2.

Referring to FIGURES 2 and 3, an accelerometer 20 embodying features of the present invention is illustrated which comprises a cylindrical housing 22 having end walls 24 and 26. The housing is made of a material having good thermal stability, such as quartz. A pair of inertial masses 28 and 30, made of a dense thermally stable metal are supported within the housing concentric with the axis thereof by a plurality of cross axis supports 32 and 34 respectively. Each of the cross-axis supports are very thin sheets of material having the inner ends thereof connected directly to the masses and end supports 36 and 38 on the other ends thereof to enable them to be firmly clamped to the wall of the housing 22. With this construction, the masses 28 and 30 are supported against cross-axis movement and are free to respond to acceleration forces along the longitudinal axis of the housing, which shall hereinafter be referred to as the sensitive axis.

A pair of tines 40 and 42 are clamped between the end wall 24 of the housing and the inertial mass 28 with end supports or spacers 44 and 46 on the ends thereof to facilitate the clamping of the tines to the end wall and inertial mass. A second pair of tines 48 and 50 are similarly clamped between the inertial mass 30 and the end wall 26 with spacers 52 and 54 on the ends thereof to facilitate clamping to the mass 30 and end wall 26.

In this embodiment, each of the tines is made from a very thin beam of magnetic permeable material. The tines 40 and 42 form a tuning fork 56 and the tines 48 and 50 form a tuning fork 58 which may be vibrated at their natural frequency by solenoids 60 and 62, respectively, positioned between the tines of each tuning fork and energized by an A.C. voltage, as will be described in greater detail hereinafter. A pair of interconnected pickup coils 64 and 66 are positioned in the air gaps between the ends of the solenoid 60 and the tines 40 and 42, respectively, and a similar pair of pickup coils 68 and 70 are positioned in the air gap between the solenoid 62 and the tines 48 and 50, respectively, so that each of the pickup coils will have a voltage induced therein having the same frequency as that of the vibrating tine adjacent thereto.

With this construction, the tines are not tensioned by the inertial masses 28 and 30 in a zero G environment. However, when the accelerometer 20 is accelerated along its sensitive axis to the right, as viewed in FIGURE 2, the inertial mass 28 will compress the tines 40 and 42 to decrease their natural frequency of vibration and the inertial mass 30 will tension the tines 48 and 50 to increase their natural frequency of vibration. These changes in frequency will be detected by the pickup coils 64–70 and the output of the pickup coils may be applied to a suitable circuit such as, for example, the circuit illustrated in FIGURE 4 to indicate the magnitude of the acceleration along the sensitive axis as a digital number. The signal from the pickup coils is also fed back to the solenoids 60 and 62 to control the frequency of the energizing voltage to maintain the tines vibrating at their natural frequency.

Figure 4:
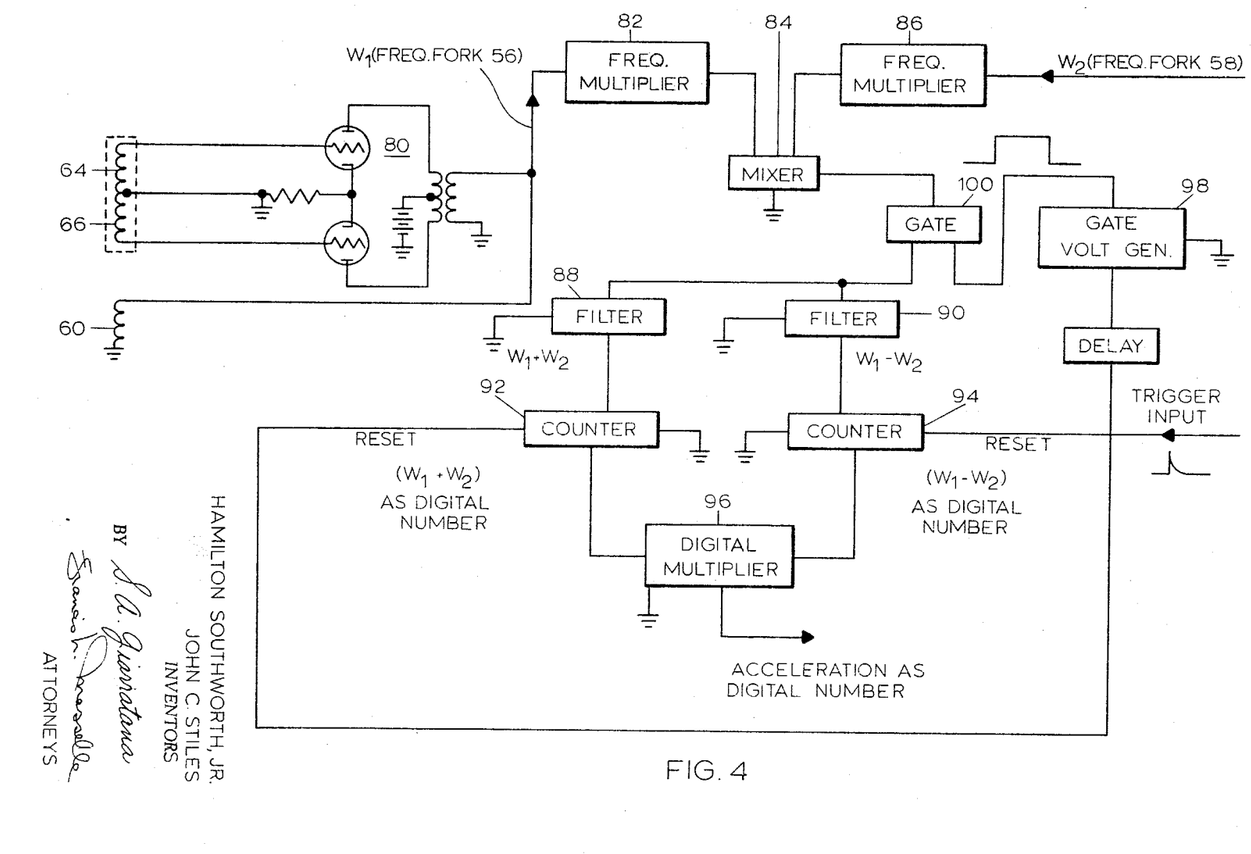
FIGURE 4 is a schematic diagram of a circuit for the accelerometer illustrated in FIGURES 2 and 3.
Figure 5:
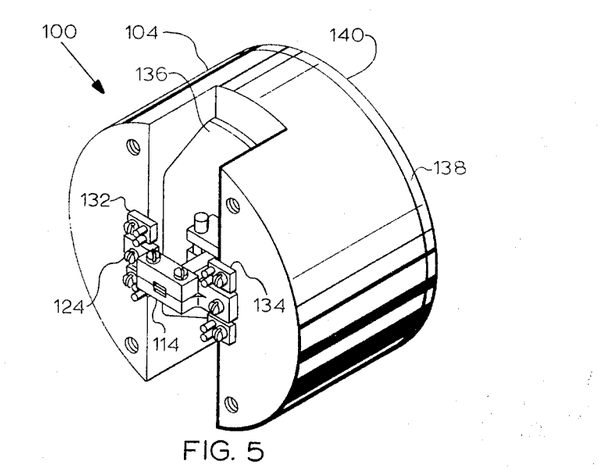
FIGURE 5 is a perspective view of the front end of an accelerometer illustrating another embodiment of the invention.
Figure 6:
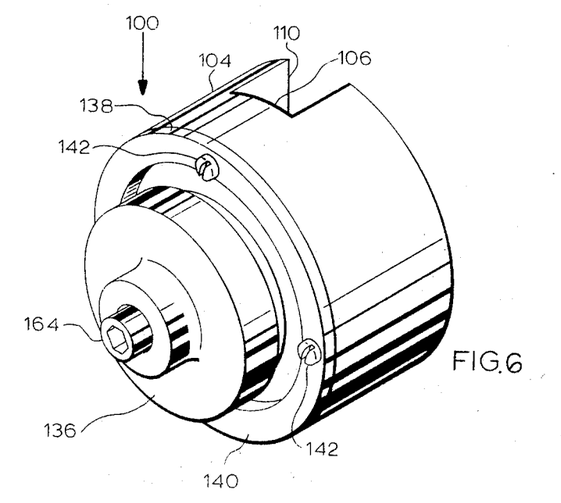
FIGURE 6 is a perspective view of the rear end of the accelerometer illustrated in FIGURE 5.

Referring specifically to FIGURE 4, one type of electrical circuit for the accelerometer 20 is illustrated. The A.C. voltage induced in the pickup coils 64 and 66 is amplified by an amplifier 80 and this amplified voltage is applied to the solenoid 60 to sustain the vibration of the tines 40 and 42 at their natural frequency. The amplified voltage having a frequency $W_1$ which is the same frequency as that of the tuning fork 56 is applied to a frequency multiplier 82 and then to a mixer 84. An identical feedback circuit (not shown) is provided to sustain the vibration of the tines of the tuning fork 58 and a voltage having the frequency $W_2$ which is the same frequency as that of the tuning fork 58 is similarly applied to a frequency multiplier 86 and then to the mixer 84 where it is mixed with the frequency $W_1$. The intermodulation of the frequencies $W_1$ and $W_2$ that occurs in the mixer 14 produces the sum and difference frequencies $W_1+W_2$ and $W_1-W_2$ which, after separation by filters 88 and 90, are applied to counters 92 and 94, respectively. The counters convert these frequencies into proportional digital numbers which are then multiplied in a digital multiplier 96 to produce the acceleration as a digital number. The interval over which this takes place is determined by the length of the gate voltage produced by a generator 98 which opens gate 100 admitting the output frequencies of the mixer to the counters 92 and 94. The generation of the gate voltage is controlled by a trigger pulse which is also applied as a reset pulse to the two counters. The pulse is delayed before application to the gate voltage generator in order to allow resetting of the counters to be completed before a new computing period is initiated.

As stated previously an acceleration along the sensitive axis (X axis) causes both tines of each tuning fork to go into either compression or tension due to the inertial force of the masses 28 and 30. This causes a decrease or increase in the natural frequency of the tuning fork and the change in frequency is proportional to the square root of acceleration. An acceleration along the Y and Z axes (cross-axis acceleration) will cause each tine in the tuning forks to bend about its own neutral axis and cause no change in the natural frequency of the tuning forks. By arranging the two tuning forks in back-to-back relation as illustrated in FIGURE 2 so that the natural frequency of one is increased while that of the other is decreased in response to acceleration along the sensitive axis, temperature sensitivity is reduced and the two outputs from the tuning forks may be combined in a very simple way to produce the acceleration output with errors minimized as previously stated. Furthermore the change in frequency is now proportional to acceleration. An alternate method is to use only one tuning fork rather than the two as illustrated in FIGURES 2 and 3 and to compare the single tuning fork with a timing reference in the digital computer to determine its frequency change.

As previously stated, temperature sensitivity is most severe in string or membrane elastic elements where there is a sizable tensile stress field under a zero G field. Any temperature expansion of the structure or vibrating element will change this stress field and provide an undesirable frequency change. However, it is apparent that the tuning fork accelerometer of the present invention has no stress environment under a zero G acceleration, and due to the cantilever configuration, by which the inertial masses 28 and 30 are independently supported, stress changes in the tuning forks due to housing thermal expansion or contraction is eliminated. Because the accelerometer of the present invention uses bending as opposed to string action, it has greatly reduced temperature sensitivity. However, the cross-sectional moment of inertia of the tines of the tuning forks have to be minimized and the inertial masses maximized to provide a practical scale factor, the scale factor of the tuning fork being defined as the frequency change per unit G along the sensitive axis ($\Delta f/G$). An important advantage of the invention is that the geometry of the tuning fork allows a large mass to elastic ratio without reducing elastic spring constants to an impractical level. However, for some applications, accelerometers made in accordance with the teaching of the present invention may have the cross-axis supported inertial mass connected to the frame by a single tine extending along the sensitive axis, the single tine being vibrated in a similar manner.

A tuning fork digital accelerometer, as disclosed in the drawings will have either a lower natural frequency or a lower sensitivity than a string accelerometer, as can be seen from the following discussion. A tuning fork and a string accelerometer will have the same G sensitivity provided that (a) the frequencies are the same; (b) weights of inertial masses are the same; and (c) the product of the weight and the length of both elastic elements are the same. For example, compare sensitivities of a tine and a string which have the same natural frequencies and inertial mass. If both have the same length and density, the tine and string will have the same sensitivities only if their cross-sectional areas are identical. If the tine has a greater cross-section, however, it will have a lower sensitivity.

If you keep the same cross-sectional area and raise the moment of inertia of the string, you can have a tuning fork with the same frequency and sensitivity. This design is not practical, however, since the tuning fork would buckle under a compressive load. In the string accelerometer, the string does not buckle under a compressive load since it is pre-tensioned so that only reduced tension results. A tuning fork must have, therefore, an increased cross section and consequently a lower sensitivity. Attempts to raise the sensitivity of the tuning fork only result in a lower tuning fork natural frequency.

The important conclusion to be reached from the foregoing is that you cannot minimize both scale factor and natural frequency in a tuning fork. A compromise must be reached. The following rules are helpful in reaching the compromise and are listed in their order of importance. (1) Maximize the inertial weight W. This maximizes the G sensitivity but does not effect $f$ (the natural frequency of the tuning fork). (2) Minimize tuning fork width $b$. This maximizes G sensitivity but does not affect $f$. (3) Minimize tuning fork thickness $t$. This will increase G sensitivity much more than decrease $f$. Young's modulus and the tuning fork density are not considered in the optimization since they are relatively inflexible and are dependent on other factors (temperature sensitivity). The length of the tuning fork L tends to maximize $f$ and minimize G sensitivity, or vice versa. For an assumed .835% non-linearity at 20 G's, the following optimized parameters result for a tuning fork with a Young's modulus of 30 times $10^6$ p.s.i. and a tuning fork density of .3 lb. per cubic inch:

$b = 1/16$ inch $t = .003$ inch $L = 1/4$ inch $W = .0702$ lb.

These figures would apply to each of the tuning forks and masses illustrated in the drawings and result in a tuning fork having a G sensitivity of .0124 c.p.s./c.p.s. G and a natural frequency in a zero G environment of 9780 c.p.s. This compares to a G sensitivity of .0137 and a natural frequency of 9380 c.p.s. for a typical prior art string accelerometer.

It is important that the natural frequency of the tuning fork under a constant environment be stable and sharply defined. The tuning fork should have a high natural frequency transmissibility, Q, preferably 4000 or more, and both tines should have the same natural frequency. Consequently the tuning fork material should be selected to have the least internal damping. Extreme care should be taken to prevent excessive motion with resultant damping at all joints and the tuning fork will be in a vacuum to eliminate all air damping. Extreme care also should be taken to have all joints, cross-sections, and lengths of each tine almost identical.

Damping of the tuning fork comes from three areas: (a) foundation damping and interference, (b) air damping, and (c) tine internal damping. Provided a high vacuum exists around the tuning fork to negate air damping effects, foundation damping and interference should present the greatest contribution, tine internal damping being considered negligible. One vibrating tine of a tuning fork will transmit its inertial forces through its supports to its foundation. Part of these forces will be reflected back, part will be dissipated in the foundation and part will affect the other tine. To increase the Q, most of the energy should be reflected back to its source and not be dissipated in the foundation or supporting joints. For this reason, tapered joints which tend to transmit inertial forces should be avoided, and a sharply defined clamp or shrink fit joint should be used.

If the center of gravity of the inertial mass supported by a pair of tines is balanced exactly in the center of its cross-axis supports, the downward load on the inertial mass will tend to cause it to rotate in a clockwise direction to cause a tensile field to act on the upper tine and a compressive field to act on the lower tine. These stress fields must oppose the moment acting through the fixed joint connection of the tuning fork tines to provide equilibrium on the inertial mass. Unbalance and stress field in the two tines of the tuning fork is undesirable since it would affect the Q of the tuning fork at resonance, and a Q shift might reflect in a frequency change. To prevent this effect, the center of gravity of the inertial mass can be relocated slightly nearer to the tines of the tuning fork. Referring to the embodiment illustrated in FIGURE 2, it will be seen that if the center of gravity of the inertial mass 28 is located slightly to the left along the sensitive axis so that it is not positioned directly between the upper cross-axis supports 32, a counter-clockwise moment will be exerted on the inertial mass in response to a downward load on the mass.

Figure 11:
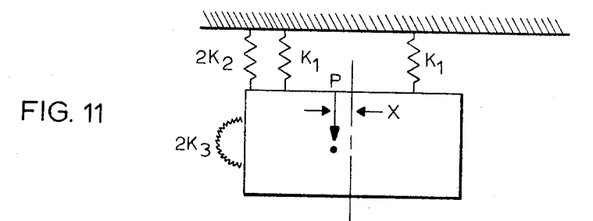
FIGURE 11 is a schematic view of the forces acting on one of the inertial masses illustrated in FIGURE 2.

The exact distance which the center of gravity should be shifted to insure that a cross-axis G acting on the inertial mass will not cause tensile and compressive stress field in the tuning fork tines may be calculated as follows with reference to FIGURES 11–13. When a cross-axis load P is applied to the center of gravity of the inertial mass 28 located a distance $x$ from the midway point of the cross-axis supports 32, the cross-axis supports placed in compression are assumed to buckle instantaneously. Thus the system can be approximated as illustrated in FIGURE 11, where $K_1$ is the axial spring of each non-buckling cross-axis support, $K_2$ the bending spring of each of the two tuning fork tines 40 and 42, and $K_3$ is a moment spring corresponding to each tuning fork tine.

Figure 12:
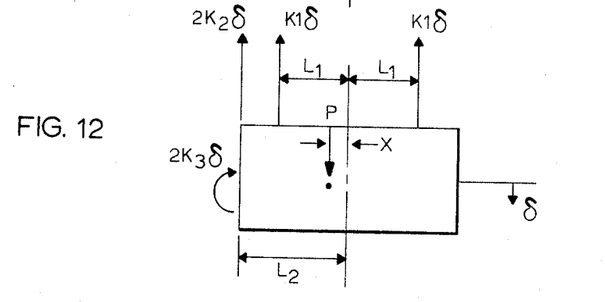
FIGURE 12 is a diagram of the moments acting on the mass of FIGURE 11.
Figure 13:
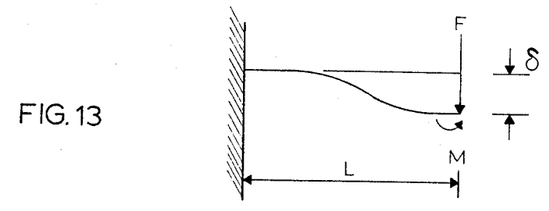
FIGURE 13 is a diagram of the deflection of a tine clamped at both ends.

If the inertial mass is assumed to deflect downward a distance $\delta$, the forces and moments acting on the inertial mass are shown in FIGURE 12. In order that the mass will not rotate causing a tensile field in one tine and a be zero. Summing moments about the center of gravity to zero:

(1)
$$K_1\delta(L_1-x) - K_1\delta(L_1+x) + 2K_2\delta(L_2-x) + 2K_3\delta = 0$$

(2)
$$-K_1x - K_2x + K_2L_2 + K_3 = 0$$

(3)
$$x = \frac{K_2L_2 + K_3}{K_1 + K_2}$$

Evaluating the springs assuming two .125″ x .001″ cross-sections for each cross-axis support of length .25″

(4)
$$K_1 = \frac{2AE}{L_4} = \frac{2(.125)(.001)\ 30\times 10^6}{\tfrac{1}{4}} = 3.0\times 10^4\ \text{lbs./in.}$$

(5)
$$K_2 = \frac{3EI}{L^3} = \frac{Ebt^3}{4L^3} = \frac{30(10^6)\ \tfrac{1}{16}(.003)^3}{4(\tfrac{1}{4})^3} = .81\ \text{lb./in.}$$

Evaluation of $K_3$ requires further explanation. Consider one tine of the tuning fork to deflect a distance $\delta$, as illustrated in FIGURE 13. Since it is a clamped-clamped tine there is a force and moment acting on this tine (F and M).

The slope of the beam must be zero at its end.

(6)
$$\theta = 0 = \frac{PL^2}{2EI} - \frac{ML}{EI}$$

or (7)
$$P = \frac{2M}{L}$$

Thus, (8)
$$\delta = \frac{PL^3}{3EI} - \frac{ML^2}{2EI} = \frac{2ML^2}{3EI} - \frac{ML^2}{2EI}$$

(9)
$$\delta = \frac{ML^2}{6EI}$$

(10)
$$M = \frac{6EI}{L^2}\delta = K_3\delta$$

Or, (11)
$$K_3 = \frac{6EI}{L^2} = \frac{Ebt^3}{2L^2} = \frac{30(10^6)\ \tfrac{1}{16}(.003)^3}{2(\tfrac{1}{4})^2} = .405\ \text{lb.}$$

(12)
$$x = \frac{(.81)\ \tfrac{5}{16} + .405}{3\times 10^4 + .81} = 2.2\times 10^{-5}\ \text{in.}$$

The center of gravity of the inertial masses may be shifted this distance $x$ by adjusting the vernier screws 29 and 31 provided on the masses 28 and 30, respectively, as illustrated in FIGURE 2.

Referring to FIGURES 7–10, an accelerometer 100 is shown which illustrates a more sophisticated embodiment of the invention. The accelerometer 100 comprises a frame 102 having a cylindrical wall 104 with diametrically opposed portions thereof removed as at 106. Segmental end walls 108 and 110 partially close off the left end of the frame as viewed in FIGURE 8 and cooperate with the cylindrical wall 104 to define a vertical opening 112 in the end of the housing as most clearly illustrated in FIGURE 7.

Figure 7:
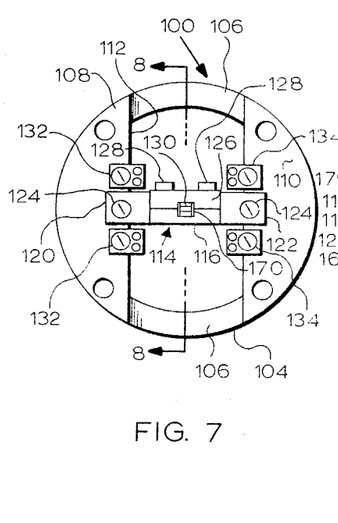
FIGURE 7 is an end view of the front end of the accelerometer illustrated in FIGURE 5.
Figure 8:
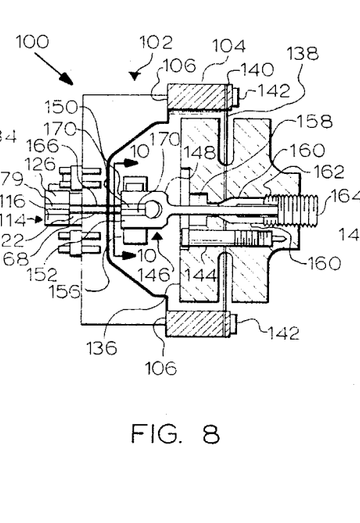
FIGURE 8 is a sectional view taken along the line 8—8 of FIGURE 7.
Figure 9:
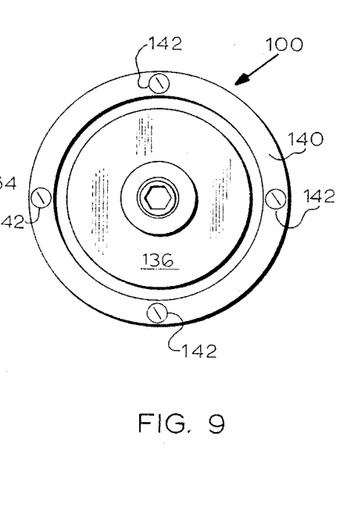
FIGURE 9 is an end view of the right end of the accelerometer illustrated in FIGURE 7.

An outer clamp 114 spans across the end walls 108 and 110 and comprises a bottom jaw 116 having an upwardly presenting notch at the center thereof and laterally projecting flanges 120 and 122 secured to the end walls 108 and 110 by bolts 124. An upper jaw 126 is bolted to the lower jaw 116 by a pair of bolts 128 and has a downwardly presenting notch therein which cooperates with the notch in the lower jaw to define a central opening 130 for clamping the tines of the tuning fork, as will be described. Terminal boards 132 and 134 are also bolted to the end walls 108 and 110 each having a pair of terminal posts projecting therefrom to facilitate electrical connection to the tines of the tuning fork, as will also be described.

Figure 10:
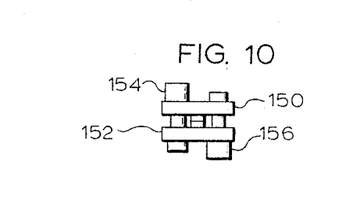
FIGURE 10 is a sectional view taken along the line 10—10 of FIGURE 8.

A two-piece inertial mass 136 is supported within the cylindrical wall 104 of the frame by a circular diaphragm 138. The outer periphery of the diaphragm is secured to the end of the cylindrical wall 104 by a clamping ring 140 which is bolted in position by a plurality of bolts 142. The two halves of the inertial mass 136 are clamped on opposite sides of the diaphragm 138 by a plurality of bolts 144 which extend through suitable clearance holes provided in the diaphragm. An inner clamp 146 is supported on the inertial mass 136 and comprises an end portion 148 split to provide an upper jaw 150 and a lower jaw 152. A pair of bolts 154 and 156 extend through the jaws to draw them together to clamp the inner ends of the ties, as will be described. A stem 158 projects from the end portion 148 through central apertures in the two-piece inertial mass and in the diaphragm in position to be tightly clamped by split fingers 160 of a collet 162 when a set screw 164 in the outer end of the inertial mass is turned inwardly to advance the fingers 160 against a cam surface in a manner to urge them radially inward.

A pair of tines 166 and 168 are supported between the inner and outer clamps 146 and 114. Each of the tines has a flat rectangular end support 170 on the ends thereof to facilitate clamping in the jaws of the inner and outer clamps without damaging the tines. The end supports reduce stress concentration and damping effects and the surfaces of the end supports and the jaws of the clamps which engage one another are carefully lapped to maximize the area of surface-to-surface engagement. In the embodiment of FIGURES 2 and 3, the structural members were made of quartz to ensure good thermal stability. However, in the accelerometer 100, all of the parts with the exception of the two terminal boards and the tuning fork tines with their end supports are preferably made of Invar. Although this material has a thermal coefficient of expansion of .9 inch per inch degree C. which is not as good as quartz (.55 inch per inch degree C.), it does provide good thermal stability, and its use is justified because of its better machining and tensile strength properties. The diaphragm 138 is very thin and is preferably made from one mil sheeting. Therefore it must be carefully handled to avoid kinking during assembly. By using one diaphragm instead of two, which would be the counterpart of the axially spaced cross-axis supports illustrated in FIGURE 2, radial stresses in the diaphragms due to diaphragm mismatch is minimized, and a one-piece frame may be used between the diaphragm and the outer clamp 114.

The accelerometer 100 may be assembled in the following manner. The two halves of the inertial mass 136 may be bolted together by the bolts 144 with the diaphragm 138 clamped therebetween. The diaphragm is then fastened to the end of the cylindrical wall 104 of the frame by the clamping ring 140 and bolts 142. The inner clamp 146 is then positioned on the inertial mass and loosely clamped by the collet fingers 160. The end supports 170 are then cemented on the ends of the tines and the adjacent end supports are cemented together so that the tines may be handled as a unit. The end supports on the inner ends of the tines are inserted into the inner clamp 146 and the bolts 154 and 156 tightened to provide a loose support. The outer clamp 114 is then bolted across the segmental end walls 108 and 110 of the frame by the bolts 124 with the end supports 170 on the outer ends of the tines positioned in the opening 130 between the jaws of the outer clamp. After the tines have been carefully straightened, the jaws of both inner and outer clamps are uniformly tightened, and the cement used to cement the end supports 170 in place dissolved by a suitable material. A suitable cement is a watch crystal cement, which may be dissolved by acetone.

After the cement has been dissolved, the clamps are further tightened to finally clamp the tuning forks into position.

It will be observed that the tines 166 and 168 of the accelerometer are spaced closer together than are the tines of the accelerometer 20 of FIGURE 2. This enables the tines to be vibrated electrostatically by passing an A.C. voltage therethrough. The tines are preferably made from quartz crystals lapped down to a thickness of .003 inch, with the confronting surfaces thereof gold-plated and wired at one end with a 5-mil wire to facilitate electrical connection of the tines to the posts of the terminal boards 132 and 134. The end supports 170 are preferably made of quartz to electrically insulate the tuning forks from one another and from the clamps and frame 102. Each end support comprises a flat quartz spacer cemented on opposite sides of the ends of the tines and cemented together as previously described with the cement being dissolved after final assembly. The spacers can be made to an accuracy of plus or minus .0001 inch and the surfaces of the jaws of the clamps which contact these spacers are also lapped for accuracy to provide maximum area engagement.

In the particular embodiment illustrated, the length of the tines between the clamps is one-fourth of an inch, and the width of each tine is one-sixteenth of an inch, with the clearance between the tines being about .007 inch and the weight of the mass being about .0702 lb. To provide tine amplitudes of about $10\mu$ inches, an A.C. voltage of 40 volts may be impressed across the tines, or a D.C. bias voltage of 40 volts may be impressed across the tines, along with a 10 A.C. voltage. Voltage frequencies of from four to eight kc. or more may be used, and the natural frequency of the tines picked up or monitored in any suitable manner, including acoustically, if desired. As before, when the inertial mass 136 is accelerated along the sensitive axis, it will compress or tension the tines to decrease or increase their natural frequency to provide a measure of the acceleration. Circuitry analogous to that illustrated in FIGURE 4 may be employed to convert this acceleration output to digital form and also to provide a feedback circuit for varying the frequency of the voltage applied to the tines to maintain the vibration of the tines at their natural frequency. Also a second accelerometer 100 may be employed reversed 180° from the first to provide two units in a back-to-back relationship similar to that illustrated in FIGURE 1 to improve the accuracy of the unit. As before, the space around the tines would be evacuated to minimize air damping. As is depicted in the circuit illustrated in FIGURE 4, the following sum and difference technique can be used. Take the sum and the difference of the frequencies of two accelerometers 100 reversed 180° from one another, and multiply them. The result is exactly proportional to the input acceleration. The natural frequency of one tuning fork under a +G acceleration is:

$$f_{+G} = C_1 \sqrt{1 + C_2\left(T + \frac{GW}{2}\right)}$$

Where
$C_1 = 20.34 \ t/L_2\sqrt{E/\delta}$
$C_2 = .286 \ L^2/Ebt^3$
$T$ = axial tension
$W$ = weight of each mass
$L$ = length of tine
$b$ = width of tines
$\delta$ = density of tines
$t$ = thickness of tines and
$E$ = Young's modulus The natural frequency of the other tuning fork under a −G acceleration is:

$$f_{-G} = C_1 \sqrt{1 + C_2\left(T - \frac{GW}{2}\right)}$$

Multiplying the sum and differences of these frequencies:

$$(f_{+G} + f_{-G})(f_{+G} - f_{-G}) = f_{+G}^2 - f_{-G}^2$$

$$(f_{+G} + f_{-G})(f_{+G} - f_{-G}) = C_1^2\left[1 + C_2\left(T + \frac{GW}{2}\right)\right] - C_1^2\left[1 + C_2\left(T - \frac{GW}{2}\right)\right]$$

$$(f_{+G} + f_{-G})(f_{+G} - f_{-G}) = C_1^2 C_2 GW$$

Thus the result is exactly proportional to G. The sum and the difference frequencies may be multiplied by direct frequency count of both tuning forks followed by digital computation. This would be used in place of electronic techniques used for prior string accelerometers, i.e., (a) beating both frequencies, (b) frequency multiplication, (c) non-linearity corrections.

The tines of the accelerometer 100 may also be vibrated by piezoelectric excitation. The best frequency stabilities today are obtained by piezoelectrically exciting quartz crystals. Stabilities are in the order of one part per $10^{10}$ and Q's in the order of $10^6$ for the best crystals. The use of a crystal in a fixed-fixed mode, rather than a free-free mode, will lower the Q of the crystal, but a Q better than 5,000 still may be obtained. The piezoelectric excitation of the crystal tines in a thickness-flexure mode may be accomplished by using a bimorph crystal having two 5° X-cut quartz plates cemented together with polarities opposing to form each tine. The necessary electrical connections may be made directly from the posts of the terminal boards 132 and 134 to the crystal tines. Alternatively, a shear action may be used to excite tines made from a Y-cut quartz plate, the use of a Y-cut crystal eliminating the need for two cuts as does the aforementioned X-cut crystal. Or a width flexure technique may be employed for vibrating tines made from crystals having an NT cut. This latter technique normally uses electrical terminals on the thickness dimension (edges) of the crystal, but with tines having the small thicknesses of the embodiments described above, it would be impractical to attempt to place the terminals on the edges. Therefore they may be placed on the width side nearer the edges of the crystal to provide flexural excitation. Another possible way of piezoelectrically exciting a thin crystal in a length-thickness flexure (besides a bimorph) is to excite a single X-cut crystal in a longitudinal mode which, because of its fixed-fixed support will flex in a lateral frequency.

Figure 14:
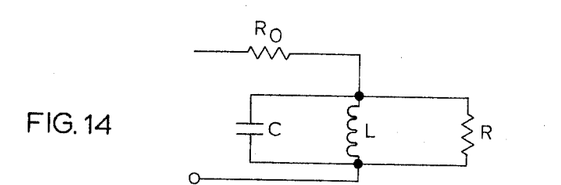
FIGURE 14 is a schematic diagram of an electronic circuit analogous to a vibrating wire.

The tines of the tuning fork may also be vibrated by a magnetic drive which is advantageous since it is commonly used for vibrating tuning forks and also has been used in one type of string accelerometer. With a magnetic drive an alternating current is passed through the tines to cause them to vibrate at their natural frequency when subjected to a magnetic field. This magnetic field may be provided either externally such as by a permanent magnet, or by the moving current of the tines themselves. In the article, "Vibrating-Wire High Q Resonator," by A. Dixon and W. Murdon, in Electronics magazine for September 1953, a vibrating wire is shown to be analogous to the electronic circuit illustrated in FIGURE 14. At the wire's resonance, the impedance of the circuit is resistive, Z equals R and $R_0$ is the D.C. resistance of the wire, pigtails and terminals. The Q of this circuit is derived in the above reference to be:

$$Q = WRC(1 - 2(R_0/R + R_0)^2)^{1/2}$$

From this equation, it can be seen that the ratio $R/R_0$ must be greater than 1 to maximize the Q of the vibrating string. Since the aforementioned publication in Electronics magazine indicates that an external magnetic field of 7200 gauss may be employed in vibrating wires, it is clear that a greater $R/R_0$ may be obtained by using an external magnetic field rather than relying on the magnetic field of the wires themselves. It has been established experimentally that quartz tines .003 inch by one-sixteenth inch by one-quarter inch with one side silvered .0001 inch thick have an $R/R_0$ of 5.28, which is small because of the small cross-section of the vibrating tine which is conductive, but is still practical. Tines of tungsten or beryllium copper .003 inch by one-sixteenth inch by one-quarter inch have $R/R_0$ ratios of 45.8 and 18.9, respectively.

With magnetic excitation, the frequency of vibration of the tines can be detected by pickup coils positioned in an air gap which is varied by the vibration of the tines, and circuitry similar to that illustrated in FIGURE 3 may be utilized to produce the acceleration output in digital form, and to provide a feedback for varying the frequency of the alternating current passed through the tines to maintain their natural frequency of vibration which may increase or decrease in response to tension and compression of the tines.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. A digital accelerometer comprising a frame, an inertial mass, tuning fork means comprising one tine connecting said mass to said frame, and cross-axis support means for supporting said mass on said frame in a manner to introduce negligible resistance to the movement of the mass longitudinally of said tuning fork means but to resist other movements of the mass, said inertial mass compressing said tuning fork means in response to longitudinal acceleration in one direction and tensioning said tuning fork means in response to longitudinal acceleration in the other direction whereby the natural frequency of vibration of said tuning fork means will be decreased and increased to provide an indication of the magnitude and direction of the acceleration, said tine having a longitudinal portion with two identical branch portions, equally spaced from and substantially symmetrical about said tine axis forming a closed loop.

2. The invention as defined in claim 1 including means disposed within said loop between, but out of contact with, said branch portions for vibrating simultaneously and 180° out of phase, said branch portions of said tuning fork means at the natural frequency thereof, and means for monitoring the frequency of vibration of said tuning fork means and producing an output of the acceleration in digital form.

3. The invention as defined in claim 1 including a second inertial mass identical to the first mentioned mass, second tuning fork means identical to said first mentioned tuning fork means connecting said second mass to said frame, and cross-axis support means identical to said first mentioned cross-axis support means for supporting said mass on said frame in a manner to introduce negligible resistance to movement of the second mass longitudinally of said second tuning fork means, said second mass and tuning fork means being reversed 180° from said first mentioned mass and tuning fork means and being aligned parallel therewith.

4. A digital accelerometer comprising a frame with an end wall, an inertial mass, tuning fork means disposed between said mass and said end wall having rigid end connections for connecting said mass to said frame, said tuning fork means comprising a pair of fixed-ended identical parallel spaced apart tines, and cross-axis support means for supporting said mass on said frame in a manner to introduce negligible resistance to the movement of the mass longitudinally of said tines but to resist transverse movement and rotational movement of the mass, said inertial means compressing said tines in response to longitudinal acceleration in one direction and tensioning said tines in response to longitudinal acceleration in the other direction whereby the natural frequency of vibration of said tines will be decreased and increased to provide an indication of the magnitude and direction of the acceleration, and including means disposed substantially midway between said tines suitable for vibrating said tines simultaneously and 180° out of phase at their identical natural frequencies.

5. The invention as defined in claim 4 wherein the center of gravity of said mass is normally displaced toward said tines from the cross-axis defined by said cross-axis supports, and the mass has adjustable portions for slightly shifting the center of gravity of said mass longitudinally and transversely from its said normal position.

6. The invention as defined in claim 4 wherein each of said tines has a length to thickness ratio of not less than 50 and a width to thickness ratio of not less than 10.

7. The invention as defined in claim 4 wherein said tines are spaced close together and form a pair of capacitor plates so that they may be vibrated electrostatically by applying an A.C. voltage thereacross.

8. The invention as defined in claim 4 wherein each of said tines is made of a thin strip of quartz having a conductive coating on one face thereof so that the tines form a pair of capacitor plates whereby they may be vibrated electrostatically when an A.C. voltage is applied across the conducting layers.

9. The invention as defined in claim 8 including end supports on the ends of each of said tines, and clamping means engaging said end supports and connecting the tines to the frame and inertial mass.

10. The invention as defined in claim 9 wherein said clamping means comprises a first clamp attached to said frame and clamping the end supports on one pair of ends of said tines with a smooth flat surface area engagement and a second clamp attached to said inertial mass and clamping the end supports on the other pair of ends of said tines with a smooth flat surface area engagement.

11. The invention as defined in claim 10 wherein said frame, first and second clamps, inertial mass, and cross-axis supporting means are all made of Invar.

12. A digital accelerometer comprising a frame, a diaphragm supported on said frame, a two-piece inertial mass clamped on opposite sides of said diaphragm so as to be supported thereby with negligible resistance against movement along a sensitive axis passing through the inertial mass perpendicular to said diaphragm, and tuning fork means extending along said sensitive axis for connecting said mass to said frame whereby the inertial mass compresses the tuning fork means in response to acceleration along the sensitive axis in one direction and tensions said tuning fork means in response to acceleration along the sensitive axis in the other direction to vary the natural frequency of vibration of said tuning fork means, said tuning fork means comprising a pair of fork handles having a common axis with one fork handle fixedly connected to said frame and with the other fork handle fixedly connected to said mass, and a pair of parallel prongs equally spaced and symmetrical about said axis, connected at each end to a fork handle.

13. The invention as defined in claim 12 wherein said diaphragm is made of a thin sheet of temperature-stable material about .001 inch thick.

14. The invention as defined in claim 12 wherein said diaphragm is circular and the periphery thereof is clamped to said frame by a clamping ring which clamps the periphery of the diaphragm to the frame.

15. The invention as defined in claim 12 wherein said tuning fork means is made at least in part from a piezoelectric crystal which will vibrate in a length-thickness mode when excited electrically.

16. A digital accelerometer including a pair of identical accelerometer portions, separately supported, arranged parallel to each other and 180° reverse to each other, each accelerometer portion comprising:

a tuning fork means having an intermediate portion with a pair of parallel identical vibrating columnar elements, each distorting in a single wave shape extending from end to end, at the same resonant wave frequency but in opposite movement;

a support structure fixedly connected to one end of said fork means; and an axially displaceable, transversely guided, non-rotatable inertial mass fixedly connected to the other end of said fork means to apply its acceleration force coaxially along said fork means when said mass is accelerated thereby causing a similar measurable change in the common resonant frequency of the fork elements.

References Cited by the Examiner

UNITED STATES PATENTS

| | | | |
|---|---|---|---|
| 2,928,668 | 3/1960 | Blasingame | 73—517 |
| 2,974,531 | 3/1961 | Ackerman | 73—516 |
| 2,988,921 | 6/1961 | Rubin. | |
| 3,122,024 | 2/1964 | Trachtenberg. | |

RICHARD C. QUEISSER, *Primary Examiner.*

S. FEINBERG, BENJAMIN A. BORCHELT, JAMES J. GILL, *Examiners.*

L. L. HALLACHER, W. C. ROCH, *Assistant Examiners.*